E. PHILLIPS.
Machine for Cleansing, Dressing, and Cutting Flax.
No. 47,604. Patented May 2, 1865.
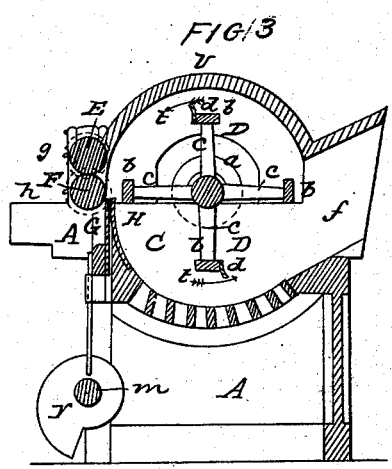
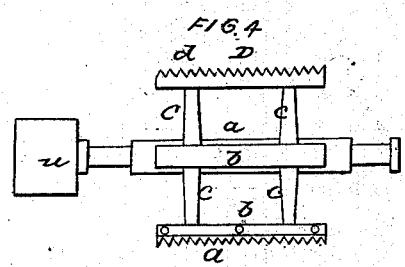
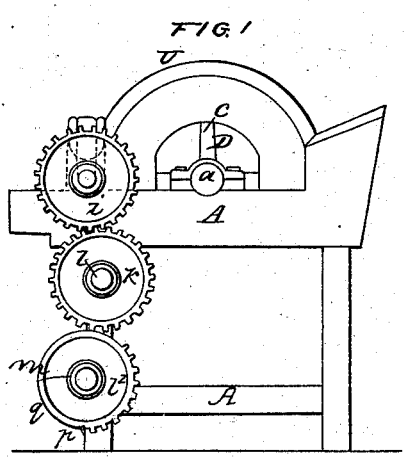
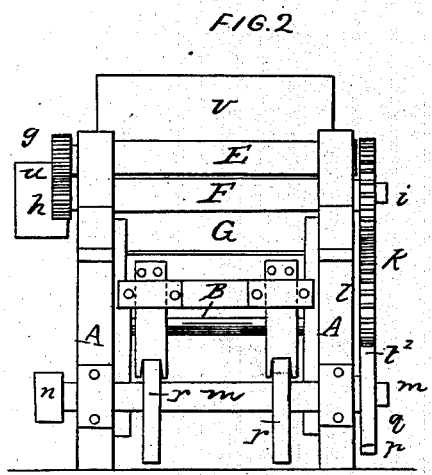
WITNESSES
F. P. Hale Jr.
H. E. Fisher
INVENTOR
Ezekiel Phillips
by his attorney
R. H. Eddy

UNITED STATES PATENT OFFICE.

EZEKIEL PHILLIPS, OF BLACKSTONE, MASSACHUSETTS, ASSIGNOR TO HIMSELF AND DANL. B. POND, OF WOONSOCKET, RHODE ISLAND.

IMPROVEMENT IN MACHINES FOR CLEANSING, DRESSING, AND CUTTING FLAX, &c.

Specification forming part of Letters Patent No. 47,604, dated May 2, 1865.

*To all whom it may concern:*

Be it known that I, EZEKIEL PHILLIPS, a resident of Blackstone, in the county of Worcester and State of Massachusetts, have invented a new and useful machine for cleansing, dressing, and cutting flax or other fibrous material, to which such machine may be applicable; and I do hereby declare the same to be fully described in the following specification and represented in the accompanying drawings, of which—

Figure 1 denotes a side elevation, Fig. 2 a rear elevation, and Fig. 3 a longitudinal section, of it.

The purpose of my invention is to reduce long fibers or stalks of flax into shorter lengths, to remove therefrom dirt or extraneous matters, and dress or beat and prepare such fibers for being spun or otherwise treated.

The nature of my said invention is found in a combination substantially as hereinafter described, it consisting not only of an intermittent feeding mechanism and a cutting mechanism, or a mechanism for cutting the fibers into shorter lengths, but a stationary grid, and a mechanism for beating and dressing the fibers and winnowing them, so as to separate from them dirt or extraneous matters, and finally discharge them from the machine; and my invention further consists in an improvement in the sectional gear of the feeding mechanism.

In the drawings, A denotes the frame of the machine, such frame being provided with a curved grid or grating, B, having its bars arranged transversely with the said frame. The said grid is arranged at the lower part of the chamber C, in which there is placed a rotary beater and comber, D, composed of a horizontal shaft, $a$, and a series of bars, $b\ b\ b\ b$, each of which is arranged parallel to the shaft, and is connected to it by two or any other suitable number of arms, $c\ c$. Every other one of the said bars is arranged at a less distance from the shaft than is either of the others next adjacent to it; and is provided with a serrated bar or comb, $d$, the teeth of which project beyond it, as shown in Figs. 3 and 4, the latter figure being a side view of the rotary beater and comber D.

In advance of the rotary beater D, the case surrounding it is provided with a discharging-mouth, as shown at $f$ in Fig. 3, while in rear of the beater is a set of feed-rollers, E F, to the bite of which the stuff or stalks of flax or fibrous material to be operated on may be led by an endless apron, or by any other suitable means. These feed-rollers are geared together by connecting-gears $g\ h$, applied to the two adjacent ends of the rollers, or arranged as shown in the drawings. One of these rollers is disposed directly over the other, the lower one being provided with a large gear, $i$, which meshes into or engages with another communicating gear, $k$, applied to and so as to be capable of being freely revolved on a stud, $l$, projecting from the side of the frame. In its turn the gear $k$ is operated by a driving sectional gear, $l^2$, which is fixed on a horizontal shaft, $m$, extending across the rear part of the frame, and carrying a driving-pulley, $n$. This sectional gear has teeth only on an arc or portion of its circumference, the same being as shown at $o$. It also has a separate or auxiliary tooth, $p$, which is affixed to a curved spring, $q$, arranged in the circumference of the wheel, or making part of the same, as shown in Fig. 1. The spring-tooth, by its action during the revolution of the gear, of which it forms a part, is for the purpose not only of insuring the engagement of the toothed arc $o$ with the teeth of the wheel $k$, but of preventing a tooth of the arc from so riding upon or impinging against a tooth of the gear $k$ as to create a breakage of either tooth or a damage of another part of the machine.

The shaft $m$ carries two wipers, $r\ r$, which serve to elevate at the proper time, and subsequently allow to fall by its gravity a straight knife or shear, G, arranged with respect to the feed-rollers, the beater and a stationary cross-plate, H, as shown in Fig. 3.

The beater is to be put in rapid revolution in the direction of the arrow $t$ by a belt caused to run on a driving-pulley, $u$, fixed on the shaft of the said beater, the said beater being covered by an arched cap, $v$.

The operating mechanism of the feed-rollers being set in action, the flax, when presented to such rollers, will be moved forward into the machine with intermittent movements— that is to say, it will be advanced short distances, with an interval of rest prior to each advance. While held stationary by the feed-rollers, as well as during its advance into the machine, the portion extending therein and beyond the feed-rollers will be beaten and scutched or combed by the rotary beater, which will not only beat out of or separate from the fibers the dirt and extraneous matters, but cause such dirt and matters to be thrown down upon and blown through the grid. The beating and combing operations having taken place, the knife will be elevated or forced upward to the flax, in order that by the action of the beater the dressed portion of the flax may be separated by the knife from the remainder, and be winnowed by the beater and thrown forward by it and driven out of the machine. This having been done, another advance of the flax will be effected by the feed-rollers, they being put in revolution therefor. The flax or fibrous material will thus be advanced, dressed, and separated or cut off until the whole may have been reduced to short lengths, sufficient for being used for the fabrication of what is usually termed "flax-cotton" or "fibrilla," or for such other purposes as may be required.

I claim—

1. The combination or machine $a$, consisting not only of the intermittent feeding mechanism, and the movable knife or mechanism for cutting off the fibers, in manner as described, but a stationary grid or grating, (arranged in the case as set forth,) and a rotary beater, so arranged as not only to operate with the knife and cause it to cut off the flax or fibrous material, as explained, but to beat and comb or dress it, and subsequently discharge it from the machine, substantially as specified.

2. For use in this particular class of machines, the sectional driving-gear $l$, as made not only with an arc of teeth, but with an auxiliary tooth supported by a spring arranged with respect to such arc, substantially in manner and for the purpose as hereinbefore explained.

E. PHILLIPS.

Witnesses:
R. H. EDDY,
F. P. HALE, Jr.